United States Patent Office 2,845,437
Patented July 29, 1958

2,845,437
ACYLAMIDO-DIPHENYLINDOLES

Louis E. Craig, Pryor, Okla., assignor to General Aniline & Film Corporation, New York, N. Y., a corporation of Delaware No Drawing. Application June 21, 1956
Serial No. 592,747

1 Claim. (Cl. 260—319)

This invention relates to the preparation of new acylamido-diphenylindoles, and relates more particularly to the preparation of new acylamido-2,3-diphenylindoles by a condensation reaction involving an aminoacetanilide and an unsubstituted or substituted benzoin.

I have found that diphenylindoles are suitable for use as whitening or brightening agents for textile products, such as fibers, filaments and fabrics, having a basis of synthetic materials, for example, nylon, cellulose esters, polyesters of terephthalic acid and ethylene glycol, polymers of acrylonitrile, copolymers of acrylonitrile and vinyl chloride and the like, as well as for films and plastic bodies of said synthetic material. This I have described and claimed in my copending application S. No. 592,721, filed on even date herewith (now abandoned).

It is an object of this invention to prepare new acylamido-diphenylindoles which are highly satisfactory brightening agents for white and dyed materials in a simple and expeditious manner.

Other objects of this invention will appear from the following detailed description and claims.

In accordance with this invention, there are prepared new compounds having the following formula

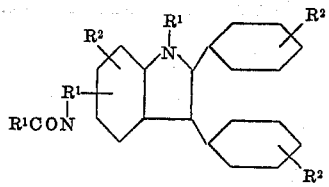

where $R^1$ and $R^2$ may be hydrogen, alkyl, aryl, arylalkyl, and substituted alkyl groups such as hydroxyethyl, cyanoethyl, alkoxyethyl, and the like, and $R^2$ may be the same or may also be halogen, hydroxy, alkoxy, amino, alkylamino, acylamino, carbalkoxy, cyano, and the like and wherein the $R^2$ substituents may be the same or different.

The above compounds may be prepared in accordance with the instant invention by reacting an aminoacylanilide with an unsubstituted or substituted benzoin. More specifically, a solution of the amino acylanilide and the benzoin is heated at reflux temperature in an inert atmosphere such as nitrogen or carbon dioxide and in the presence of a catalyst, the water formed in the reaction removed, and the residue permitted to cool whereby crystals of the acylamido-2,3-diphenylindole are formed.

This invention will be specifically illustrated, but not limited by the following examples, the parts being by weight.

Example I

A mixture of 30 parts of m-aminoacetanilide, 38 parts of benzoin, 3 parts of p-toluenesulfonic acid and 120 parts of nitrobenzene was heated at reflux under nitrogen with the water formed in the reaction being removed with a moisture trap. In one hour, the theoretical amount of water had been collected. On cooling, tiny needles separated. The 6-actamido-2,3-diphenylindole was collected by filtration, washed free of nitrobenzene with cold ethanol and dried. 22.5 parts (38% of theory) of very light tan needles were obtained. Recrystallization from ethanol gave needles, melting point 282–283° C.

Example II

A mixture of 33 parts of m-amino-acetanilide, 42 parts of benzoin, 3 parts of p-toluenesulfonic acid and 200 parts of o-dichlorobenzene was heated at reflux under nitrogen, with the liberated water being removed by means of a moisture trap. Solution became clear before reflux started. Soon after reflux, a fine solid began to separate. After two hours no more water was formed. After cooling, the solid was collected, washed free of solvent with acetone, and dried. 44 parts (68% of theory) of very light grey 6-acetamido-2,3-diphenylindole were collected.

Example III

The procedure of Example II was followed except that about 150 parts of dimethylaniline were used in place of the o-dichlorobenzene. In five hours, the water evolution had ceased. The product which separated on cooling was collected by filtration, washed well with methanol and dried to give 35.8 parts (55% of theory) of nearly colorless 6-acetamido-2,3-diphenylindole, melting point 278–281° C. Additional product was obtained by pouring the dimethylaniline solution into an excess of dilute acetic acid and washing the resulting solid with ethanol.

Example IV

The procedure of Example II was followed except that about 150 parts of tetralin were used in place of the o-dichlorobenzene. In about two hours, the evolution of water was complete. The reaction mixture was cooled, about 100 parts of benzene added, the solid product collected, washed well with cold ethanol, and dried. 27.5 parts (42% of theory) of essentially colorless 6-acetamido-2,3-diphenylindole were obtained, melting point 279–282° C.

Example V

A mixture of 37 parts of p-aminoacetanilide, 42 parts of benzoin, 5 parts of p-toluenesulfonic acid and about 200 parts of o-dichlorobenzene was heated under nitrogen at reflux with the water formed in the reaction being removed by a moisture trap. After two hours the evolution of water had ceased. The reaction mixture was cooled, the solid collected by filtration, washed well with benzene, and cooled to give a light brown product. Recrystallization from benzene gave essentially colorless 5-acetamido-2,3-diphenylindole, melting point 242–243° C.

Example VI

A mixture of 39.4 parts of p-amino-N-methylacetanilide, 42 parts of benzoin, 5 parts of p-toluenesulfonic acid and about 200 parts of o-dichlorobenzene was heated for three hours at reflux under nitrogen with water being removed by a moisture trap. After cooling, the solid was collected, washed well with ethanol, and dried, to give 38 parts (55.9% of theory) of light tan needles. Recrystallization from acetic acid gave 5-acetylmethylamino-2,3-diphenylindole as colorless needles, melting point 350–353° C.

Example VII

A mixture of 4.4 parts of 4-amino-m-acetotoluidide, 5.3 parts of benzoin, 0.5 part of p-toluenesulfonic acid and about 50 parts of dimethylaniline was heated under nitrogen for 2½ hours with water being removed by moisture trap. On cooling, a solid separated. The solid was collected, treated with hot ethanol, and dried. 2.7 parts of 5-acetamido-7-methyl-2,3-diphenylindole were obtained as a light tan solid, melting point 219–223° C. Recrystallization from acetic acid gave colorless prisms, melting point 220–223° C.

The condensation described in the above examples may also be carried out with substituted benzoins, such as 4-methoxy-, 3,4-methylenedioxy-, 4-dimethylamino-, 2-hydroxy-, 2'-hydroxy-, 4'-methoxy-, 2,2'-dimethoxy-, 4,4'-dimethoxy-, 4,4'-diacetamido-3,3',4,4',5,5'-hexamethoxy-, 4,4'-diphenyl-, 4-phenyl-, 4-chloro-, 4-chloro-4'-methoxy-, and 3,3'-dichlorobenzoin, and the like.

Examples of other acetanilides which may be condensed with the benzoins to form the products of this invention are the 2-amino-, 3-amino-5-chloro-, 5-amino-2-dimethylamino-, p-amino-N-ethyl, 3-amino-4-hydroxy-, 4-amino-2,6-dibromo-, 5-amino - 2 - anilino-, 4-amino-2-chloro-, 5-amino-2-chloro-, 4-amino-2,5-dichloro-, 4-amino-2-hydroxy-, 5-amino-2-hydroxy-, 2-amino-4-phenyl-, 5-amino-α-2,4-trimethoxy-, 2-acetyl-4-amino-, and 3-acetyl-4-amino-, 2-amino-4-cyanomethyl-acetanilide.

Variously substituted aminoacetotoluidides, aminoformotoluidides, aminobenzanilides, amino-propioanilides and the like may also be condensed with the benzoins to form the acylamido-2,3-diphenylindoles of the instant invention.

Inert solvents other than those mentioned in the examples which may be used include such compounds as butylbenzene, diethylbenzene, cumene, diethylaniline, dibutyl ether, diethylene glycol diethyl ether, xylene, tetrachloroethane, etc. The solvent can be a hydrocarbon, halogenated hydrocarbon, ether or tertiary amine boiling from about 140° C., with the preferred boiling point being 180–200° C. The use of an inert solvent in the reaction is essential to the reaction. It is easier to control the temperature of the reaction, as a solvent with the appropriate boiling point may be chosen. Removal of water azeotropically makes it possible to follow the reaction and stop heating as soon as it is over. The refluxing liquid, along with the flushing out with nitrogen, exclude air from the reaction mixture. All of the above tend to cut down on highly colored materials which may be formed by oxidation of the aromatic amines and amino products. Upon cooling of the solution a crystallization is effectively carried out, the colored materials stay in solution, and the product may be used without further purification.

Besides p-toluene sulfonic acid, other acidic materials may be used as catalysts. Mineral acids, such as hydrochloric, hydrobromic, sulfuric, etc., other arylsulfonic acids, alkanesulfonic acids, and acidic materials such as zinc chloride, aluminum chloride, stannic chloride, borontrifluoride, and the like, are suitable.

The compounds of the instant invention may also be prepared by other methods. For example, 2,3-diphenylindole or a substituted 2,3-diphenylindole may be nitrated, the nitro compound reduced, and the resulting amino compound converted to the desired acyl derivative. Also, the phenylenediamine may be condensed with one molar equivalent of the benzoin to leave a free amino group which could be converted to the acyl derivative.

The acylamido-2,3-diphenylindoles exhibit an intense blue fluorescence under ultra-violet light in the solid state, in solution and on textile materials. Thus, 6-acetamido-2,3-diphenylindole was one of the two best 2,3-diphenylindoles evaluated for brightening of nylon and cellulose acetate as will appear from the said copending application S. No. 592,721. All are substantive to a certain extent to nylon and cellulose acetate.

It is to be understood that the foregoing detailed description is given merely by way of illustration and that many variations may be made therein without departing from the spirit of my invention.

Having described my invention what I desire to secure by Letters Patent is:

6-acetamido-2,3-diphenylindole.

References Cited in the file of this patent

UNITED STATES PATENTS

| | | |
|---|---|---|
| 2,003,421 | Balauf et al. | June 4, 1935 |
| 2,057,948 | Herdieckeroff et al. | Oct. 20, 1936 |
| 2,460,745 | Grimmel et al. | Feb. 1, 1949 |
| 2,510,428 | Standen | June 6, 1950 |

FOREIGN PATENTS

| | | |
|---|---|---|
| 533,471 | Germany | Sept. 12, 1931 |